US008340492B2

(12) United States Patent
Vasudevan et al.

(10) Patent No.: US 8,340,492 B2
(45) Date of Patent: Dec. 25, 2012

(54) METHOD AND SYSTEM FOR SHARING ANNOTATIONS IN A COMMUNICATION NETWORK

(75) Inventors: Venu Vasudevan, Palatine, IL (US); Michael Pearce, Barrington, IL (US)

(73) Assignee: General Instrument Corporation, Horsham, PA (US)

( * ) Notice: Subject to any disclaimer, the term of this patent is extended or adjusted under 35 U.S.C. 154(b) by 1118 days.

(21) Appl. No.: 11/958,093

(22) Filed: Dec. 17, 2007

(65) Prior Publication Data

US 2009/0154893 A1 Jun. 18, 2009

(51) Int. Cl.
*H04N 5/91* (2006.01)

(52) U.S. Cl. ........ 386/207; 380/204; 725/115; 707/610; 386/201; 386/208

(58) Field of Classification Search .............. 725/115; 386/207, 201, 208; 707/610; 380/204
See application file for complete search history.

(56) References Cited

U.S. PATENT DOCUMENTS

| | | | | |
|---|---|---|---|---|
| 5,969,716 | A * | 10/1999 | Davis et al. | 715/726 |
| 6,230,172 | B1 | 5/2001 | Purnaveja et al. | |
| 6,378,132 | B1 * | 4/2002 | Grandin et al. | 725/146 |
| 6,724,401 | B1 * | 4/2004 | Hennum et al. | 715/765 |
| 7,313,808 | B1 * | 12/2007 | Gupta et al. | 725/89 |
| 7,716,572 | B2 * | 5/2010 | Beauregard et al. | 715/223 |
| 2003/0196164 | A1 | 10/2003 | Gupta et al. | |
| 2004/0031058 | A1 | 2/2004 | Reisman | |
| 2005/0278747 | A1 | 12/2005 | Barton et al. | |
| 2006/0080598 | A1 | 4/2006 | Bargeron et al. | |
| 2006/0109854 | A1 | 5/2006 | Cancel | |
| 2006/0168150 | A1 | 7/2006 | Naik et al. | |

OTHER PUBLICATIONS

Carrer et al., "An Annotation Engine for Supporting Video Database Population", Multimedia Communication Laboratory, 1997, pp. 1-32.*
"Synchronized Multimedia Integration Language (SMIL) 1.0 Specification", Jun. 15, 2008.*
PCT International Search Report, RE: PCT Application #PCT/US08/86372 Dec. 11, 2008.
Office Action, Korean App. No. 10-2010-7013262, Oct. 13, 2011.

* cited by examiner

*Primary Examiner* — Kambiz Zand
*Assistant Examiner* — Tongoc Tran
(74) *Attorney, Agent, or Firm* — Susan R. Payne

(57) ABSTRACT

A method for sharing at least one annotation between a first user media terminal (102) and a second user media terminal (104) in a communication network (100) is provided. The method includes inputting (404) the at least one annotation on the first user media terminal. Further, the method includes anchoring (406) the at least one annotation to the media stream executed on the first user media terminal at a first start time. The at least one annotation is sent (408) to the second user media terminal. The at least one annotation is received (410) at the second user media terminal. Furthermore, the at least one annotation is synchronized (412) at the second user media terminal based on a relative start time. The at least one synchronized annotation is then rendered (414) to the media stream on the second user media terminal.

16 Claims, 5 Drawing Sheets

METHOD AND SYSTEM FOR SHARING ANNOTATIONS IN A COMMUNICATION NETWORK

FIELD OF THE INVENTION

This invention relates in general to communication and broadcasting networks, and more specifically, to a method and system for sharing media content between Digital Video Recorders (DVRs) in a communication and broadcasting network.

BACKGROUND OF THE INVENTION

Digital Video recorders (DVRs) are being widely used by viewers to watch recorded television programs. A DVR is also referred to as a Personal Video Recorder (PVR). Television programs can be recorded and stored on the hard drive of a DVR and can be viewed at a later time. The DVR enables a viewer to watch a time-shifted television program. For example, the viewer can start recording a television program as soon as his DVR receives it, and may watch it later on. The concept of time-shifting enables a viewer to pause, fast forward, rewind and playback even a live television program.

The DVR acts as a network device for facilitating content sharing among two or more DVRs in a communication or broadcast network. Usually, the viewers of the DVRs share recorded television content via the communication network. However, there may be instances, when a viewer wants to share personal comments about a television program with other viewers. For example, a viewer A watching a live cricket match at DVR A may want to share his personal comments at a point of the cricket match with another viewer B who is watching the same cricket match at DVR B. The comments may include audio, video, text, and image comments on the cricket match. The comments of the viewer A have to be presented as annotations to the live cricket match at DVR B. If viewer A has sent an annotation for a specific point of the match, then viewer B should receive the annotation at that point in the playback of the match. However, the cricket match at DVR B can start several seconds later than the cricket match at DVR A.

Various conventional methods have been used to add and share annotations among DVRs. One such conventional method is the closed caption tagging system. The closed caption tagging system provides a mechanism for inserting tags into an audio or video television broadcast stream prior to or at the time of transmission to the viewer. The tags are used to create indices in the program and are used to create user friendly icons on the program segment. The icons allow the viewer to jump to particular indices in a program. However, this method does not provide about adding of annotations to a program that is received from another viewer.

Other conventional method discloses a system of robust anchoring of annotations to the media content at a user media terminal. The system discloses a method of anchoring annotations to a part of media content, wherein the annotations can be input by a viewer at a user media terminal, using an input control device. The input annotations are synchronized in such a way that they are anchored with the right point of the media content at the user media terminal. However, the method does not disclose time synchronization of annotations with respect to media content at another user media terminal.

Further, a conventional system such as media presentation with supplementary media discloses addition of supplementary content to music. The various combinations of speech and audio can be added as supplementary content to music. The media monograms are spliced into music. The content of the music is immutable and the supplementary content is included at known places of the music. This method specifically mentions music and audio only. However, the method and system does not disclose sharing of time-synchronized annotations between two users.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
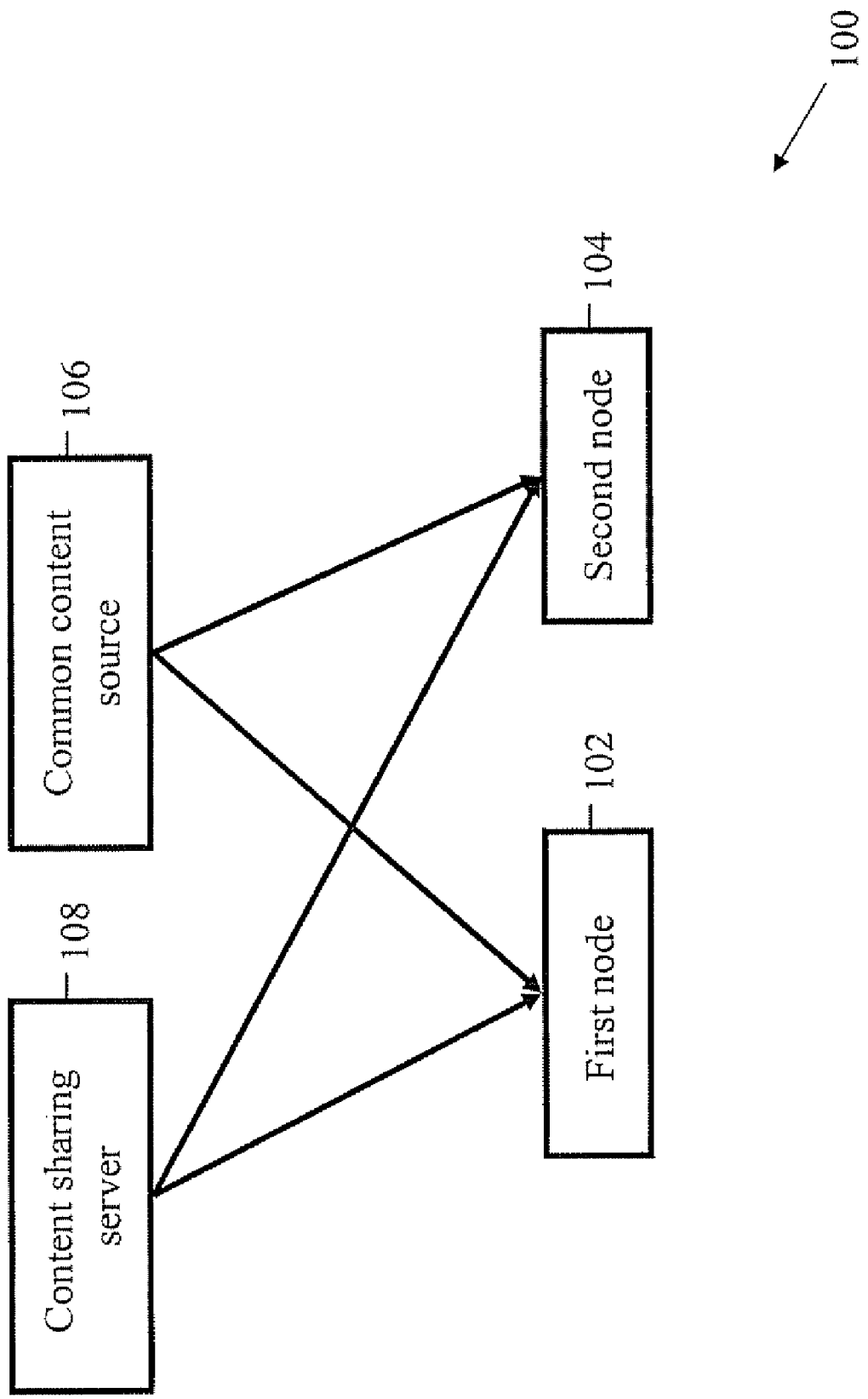
FIG. 1 illustrates a communication network in which various embodiments of the present invention can be practiced.

Persons skilled in the art will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION OF THE EMBODIMENTS

Before describing in detail the particular method and system for sharing annotations in a communication network, in accordance with the present invention, it should be observed that the present invention resides primarily in combinations of method steps and apparatus components related to the method and system for sharing annotations. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

A method for sharing at least one annotation between a first user media terminal and a second user media terminal in a communication network is provided, in accordance with various embodiments of the present invention. The at least one annotation is associated with a media stream executed on at least one of the first user media terminal and the second user media terminal. The method includes inputting the at least one annotation on the first user media terminal. Further, the method includes anchoring the at least one annotation to the media stream on the first user media terminal. The media stream on the first user media terminal is executed at a first start time. Furthermore, the at least one annotation is sent to the second user media terminal. The at least one annotation received at the second user media terminal is synchronized based on a relative start time of the media stream on the first user media terminal and the second user media terminal.

A method for sharing at least one annotation between a first user media terminal and a second user media terminal in a communication network is provided. The method includes receiving at least one annotation at the second user media terminal from the first user media terminal. Further, the method includes synchronizing the at least one annotation based on a relative start time of the media stream on the first user media terminal and the second user media terminal. The synchronized annotation is then rendered to the media stream on the second user media terminal. The media stream on the second user media terminal is executed at a second start time.

A communication network for sharing at least one annotation between a first user media terminal and a second user media terminal is provided. The at least one annotation is associated with a media stream. The media stream is executed on at least one of the first user media terminal and the second user media terminal. The first user media terminal is configured to input the at least one annotation. The first user media terminal is further configured to anchor the at least one annotation to the media stream executed on the first user media terminal at a first start time. The first user media terminal is furthermore configured to send the at least one annotation to the second user media terminal. The second user media terminal is configured to receive the at least one annotation from the first user media terminal. The second user media terminal is further configured to synchronize the at least one annotation based on a relative start time of the media stream on the first user media terminal and the second user media terminal. The second user media terminal is furthermore configured to render the synchronized at least one annotation to the media stream on the second user media terminal. The media stream on the second user media terminal is executed at a second start time.

FIG. 1 illustrates a communication network 100, wherein various embodiments of the present invention can be practiced. The communication network 100 is a network where one or more user media terminals are connected to each other and share content such as video, audio, and text with each other. The communication network 100 includes a first user media terminal 102 and a second user media terminal 104. Examples of the first user media terminal 102 and the second user media terminal 104 include, but are not limited to Digital Video Recorder (DVR) and a Personal Video Recorder (PVR). The DVRs and the PVRs simultaneously display and record media content such as television programs for their viewers. A viewer at the first user media terminal 102 is hereinafter referred to as a first viewer. Further, a viewer at the second user media terminal 104 is hereinafter referred to as a second viewer.

The first user media terminal 102 and the second user media terminal 104 can simultaneously receive the media content from a common content source 106 in the form of media streams. However, the first and second viewers can start recording the media content at different start times at their respective user media terminals. Further, the media streams may have different recording start times due to unsynchronized clocks of the first user media terminal 102 and the second user media terminal 104. This means, that the media streams of the media content are being executed/recorded on the respective user media terminals at different start times. For example, the media stream may be executed on the first user media terminal 102 at a first start time and the media stream may be executed on the second user media terminal 104 at a second start time. A relative start time of the media stream on the first user media terminal 102 and the second user media terminal 104 can be referred to as the difference in the first and second start times.

In accordance with an embodiment of the present invention, the first and second user media terminals can receive media streams of a chat show from the common content source 106. However, the first user media terminal 102 and the second user media terminal 104 can have varying recording start times of the chat show. As a result, they may view the same chat show at different times. In accordance with another embodiment of the present invention, the two viewers can share their comments on the chat show with each other. The comments may include audio, video, text, and image comments on the chat show. The comments of the viewers are represented as annotations to the chat show on the first user media terminal 102 and the second user media terminal 104. For example, the second viewer can receive the comments of the first viewer in the form of audio, video, text and image annotations on the second user media terminal 104. The annotations can also be referred to as meta-data of a media stream.

Usually, the first user media terminal 102 and second user media terminal 104 are aware of the scheduled relative start time of the media stream on the two user media terminals. Accordingly, the second user media terminal 104 renders the annotation received from the first user media terminal 102 to the media stream on the second user media terminal 104. However, when the media stream has varying recording start times due to unsynchronized clocks of the first user media terminal 102 and the second user media terminal 104, the second user media terminal 104 synchronizes the received annotation based on the variation in scheduled relative start time. The annotations are synchronized in such a way that the annotations sent for a particular point of the show are rendered by the second viewer at the same point of the show.

A content sharing server 108 is configured to share annotations between the first user media terminal 102 and the second user media terminal 104. For example, the content sharing server 110 receives at least one annotation from the first user media terminal 102 and sends them to the second user media terminal 104. Similarly, the content sharing server 108 may receive at least one annotation from the second user media terminal 104 and send them to the first user media terminal 102.

Figure 2:
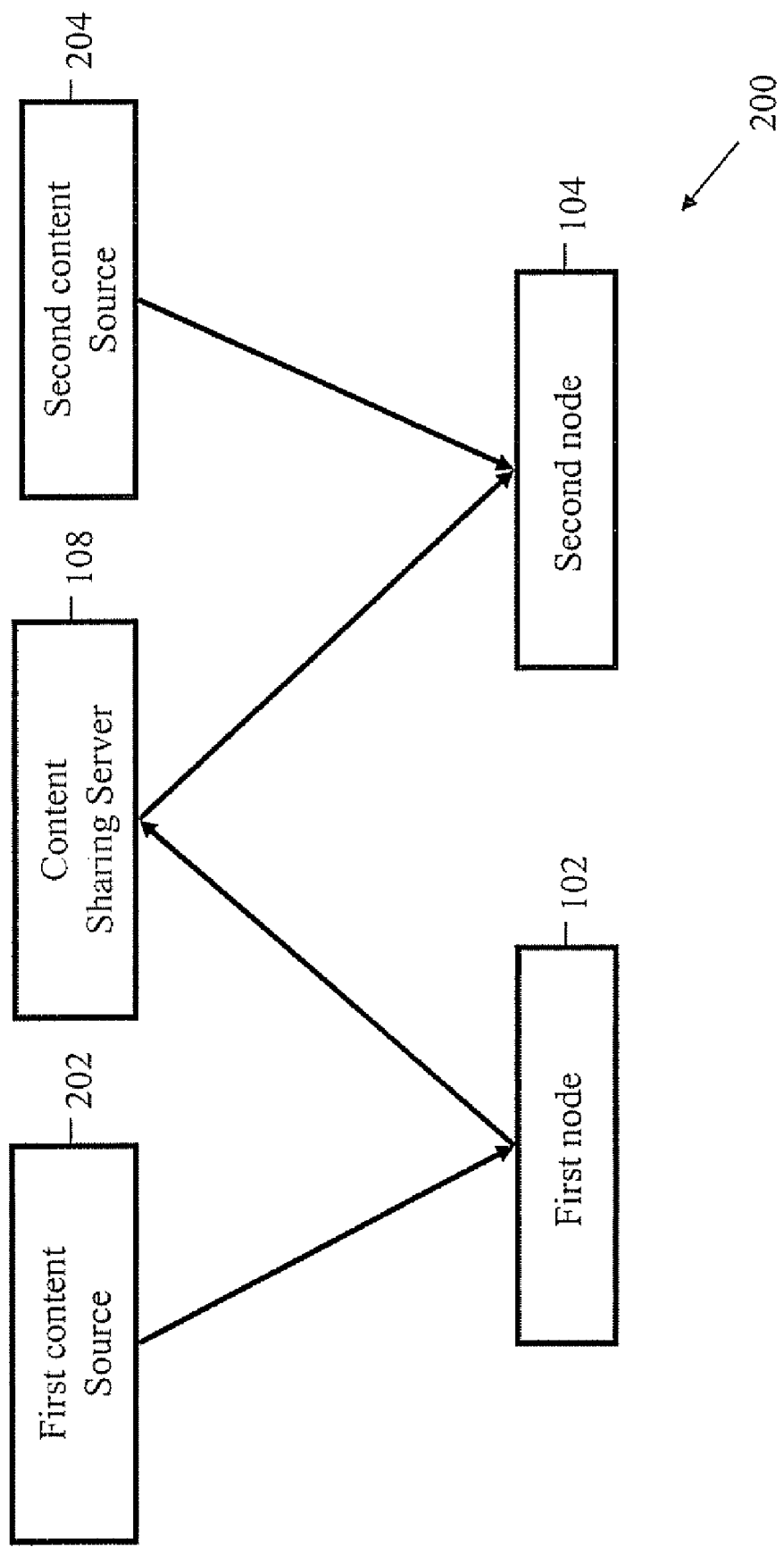
FIG. 2 illustrates another communication network in which various embodiments of the present invention can be practiced.

FIG. 2 illustrates another communication network 200, wherein various embodiments of the present invention can be practiced. In the communication network 200, the first user media terminal 102 and the second user media terminal 104 receive the similar media streams from different sources. For example, the first user media terminal 102 receives the media stream from a first content source 202 and the second user media terminal 104 receives the media stream from a second content source 204 respectively. The first user media terminal 102 and the second user media terminal 104 receive the similar media streams; however, the broadcast time of the media streams may be different at the two user media terminals. For example, the first user media terminal 102 and the second user media terminal 104 may reside in different geographic locations and start receiving the media stream at different times.

The media stream may be scheduled to be recorded at a first start time at the first user media terminal 102, whereas the media stream may be scheduled to be recorded at a second start time at the second user media terminal 104. However, there may be a variation in the relative start time of the media stream on the two user media terminals due to unsynchronized clocks at the first user media terminal 102 and the second user media terminal 104. For example, the first user media terminal 102 may be scheduled to show the media content at 1 pm and the second user media terminal 104 is scheduled to show the same media content at 2 pm. However, there may be a case, when the first user media terminal 102 starts showing the media content at 1:00:30 pm and the second user media terminal 104 starts at 1:00:15 pm. The variation of 15 seconds in relative start time is due to the relative clock skew between the first user media terminal 102 and the second user media terminal 104. The relative clock skew can be introduced by unsynchronized clocks of the first user media terminal 102 and the second user media terminal 104. The first viewer and the second viewer can watch the same media content and share annotations with each other through the content sharing server 108. When the first viewer and the second viewer watch similar media content, the annotations shared by them are synchronized based on the relative start time of the media stream on the first user media terminal 102 and the second user media terminal 104. For example, the annotations shared between the first user media terminal 102 and the second user media terminal 104 are synchronized on the basis of 15 second relative clock skew.

Figure 3:
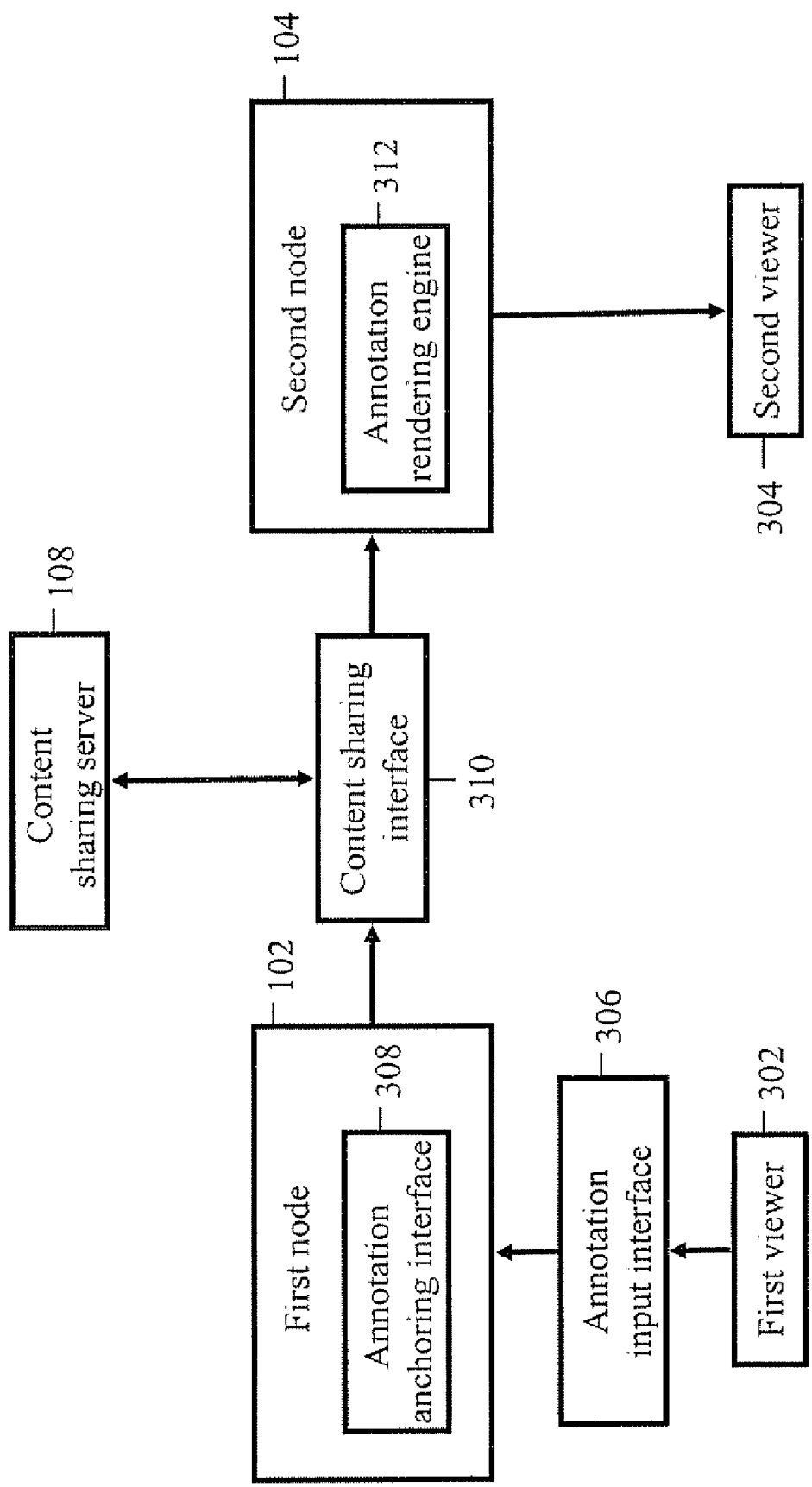
FIG. 3 illustrates various system elements of a first and a second user media terminal in accordance with various embodiments of the present invention.

FIG. 3 illustrates various system elements of the first user media terminal 102 and the second user media terminal 104, in accordance with various embodiments of the present invention. A first viewer 302 is associated with the first user media terminal 102 and a second viewer 304 is associated with the second user media terminal 104. The first viewer 302 and the second viewer 304 may watch the similar media streams at their respective user media terminals. If the first viewer 302 wants to share at least one annotation on the media stream with the second viewer 304, then the first viewer 302 can input at least one annotation on the first user media terminal 102 using an annotation input interface 306. The annotation input interface 306 is an interface between the first viewer 302 and the first user media terminal 102. The annotations input by the first viewer 302 are hereinafter referred to as inputted annotations.

The annotation input interface 306 facilitates the first viewer 302 to create annotations while watching a media stream executed on the first user media terminal 102. The media stream executed on the first user media terminal 102 is hereinafter referred to as a first media stream. The first viewer 302 creates annotations to share them with a second viewer, who can watch the similar media stream on the second user media terminal 104. The second media stream that is being executed on the second user media terminal 104 is hereinafter referred to as a second media stream. Examples of the annotation input interface 306 include, but are not limited to a remote device and a recording device. A remote device can be a remote control device of the first user media terminal 102. In accordance with an embodiment of the present invention, the remote control may include a small collection of "smiley" or emoticon buttons. The first viewer 302 can input smileys or emoticons at specific points of the first media stream by using the remote control. In accordance with another embodiment of the present invention, the first viewer 302 can input voice messages, hereinafter referred to as speech annotations, at some points of the first media stream by using the recording device.

As illustrated in the figure, the first user media terminal 102 includes an annotation anchoring interface 308. The annotation anchoring interface 308 can anchor at least one annotation to specific points of the first media stream. For example, the annotation anchoring interface 308 can anchor the inputted annotations to the first media stream. Anchoring the annotation to the media stream include adding the inputted annotations to the first media stream. The anchoring further includes recording the exact time offset of each annotation in the media stream along with enough descriptive material to uniquely identify the media stream. The time offset of each annotation is the difference between the time at which it will appear in the media stream and start of the media stream. The time offset of an annotation is calculated from the beginning of the media stream. The annotations anchored to the first media stream can be presented to the first viewer 302 along with the first media stream.

The annotation anchoring interface 308 is connected to a content sharing interface 310. The content sharing interface 310 can upload an annotation on the content sharing server 108. In an embodiment of the present invention, the content sharing server 108 can synchronize an inputted annotation based on the relative start time of the first and second media streams. Synchronizing the inputted annotation includes time-shifting the inputted annotation in such a way that the point at which it appears in the second media stream is similar to the point at which it appeared in the first media stream. Furthermore, the content sharing interface 310 can download the synchronized annotation from the content sharing server 108 and send it to an annotation rendering engine 312. The annotation rendering engine 312 can render the received annotation at the appropriate point in the second media stream, thereby presenting it as a single experience for the second viewer 304. In accordance with an embodiment of the present invention, the annotation rendering engine 312 is also referred to as media splicing and rendering engine.

In accordance with an embodiment of the present invention, the first user media terminal 102 and the second user media terminal 104 can share annotations with each other by using a Peer to Peer (P2P) protocol. In the P2P protocol, the content sharing server 108 is not required for sharing annotations between the first user media terminal 102 and the second user media terminal 104. By implementing the P2P protocol, the annotations can be shared between the first user media terminal 102 and the second user media terminal 104 using the content sharing interface 310.

Figure 4:
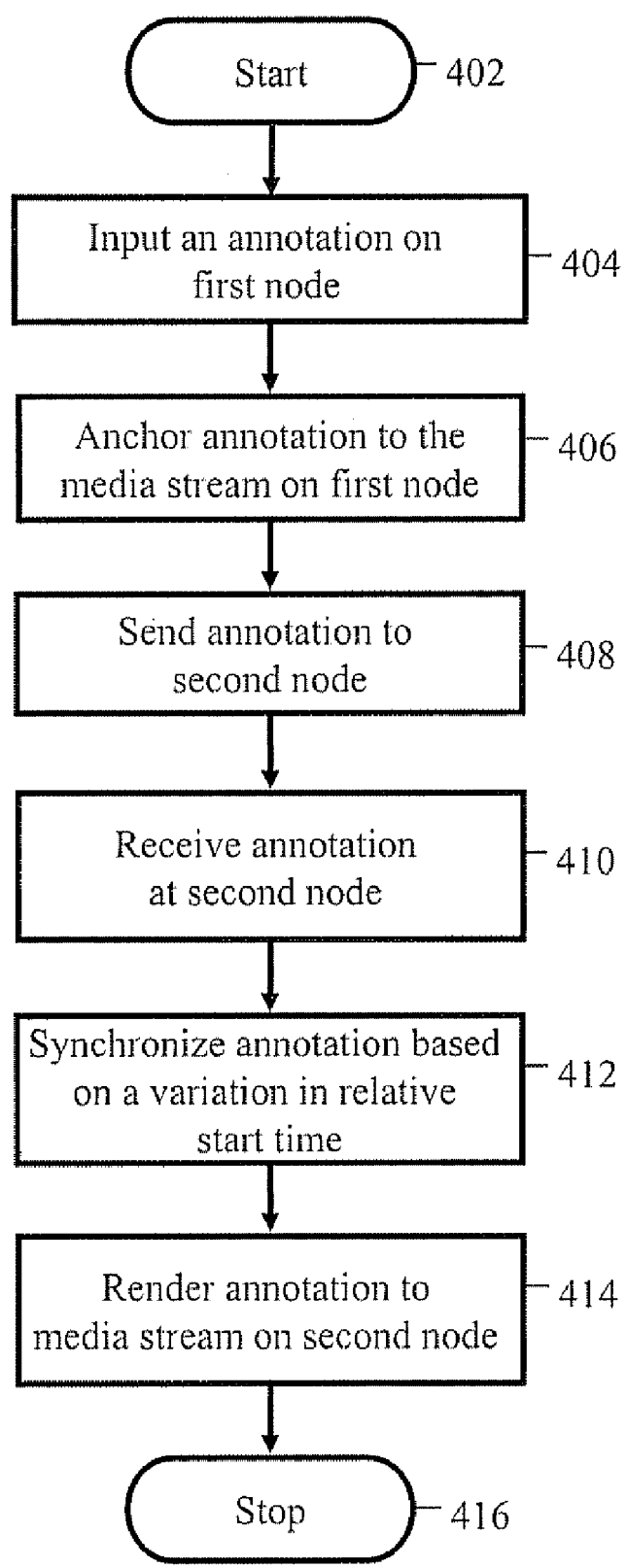
FIG. 4 is a flow diagram illustrating a method for sharing at least one annotation between the first user media terminal and the second user media terminal, in accordance with various embodiments of the present invention.

FIG. 4 is a flow diagram illustrating a method for sharing at least one annotation between the first user media terminal 102 and the second user media terminal 104, in accordance with an embodiment of the present invention. The method initiates at step 402. At step 404, the first viewer 302 inputs at least one annotation using the annotation input interface 306 for some points of the first media stream. The first viewer 302 can record speech annotations using the recording device. Further, at step 406, the annotation anchoring interface 308 anchors the at least one inputted annotation to the first media stream. The anchoring the annotation includes adding the inputted annotations to the first media stream. Further, the anchoring includes recording the exact time offset of each annotation in the media stream along with enough descriptive material to uniquely identify the media stream. The time-offset of each annotation is calculated from the beginning of the media stream.

Further, at step 408, the inputted annotations are sent to the second user media terminal 104. The annotations are uploaded to the content sharing server 108 by the content sharing interface 310. The second user media terminal 104 receives annotation at step 410 by downloading the annotations from the content sharing interface 310. Further, at step 412, the received annotations are synchronized based on a relative start time of the first and second media streams. In an embodiment, the second user media terminal 102 synchronizes the annotations. In another embodiment, the content sharing server 108 synchronizes the annotations based on the relative start time of the first and second media streams.

Various methods are used by the content sharing server 108 and the second user media terminal 104 to synchronize an inputted annotation on the basis of the relative start time of the first and second media streams.

In accordance with an embodiment of the present invention, the relative clock skew between the first user media terminal 102 and the second user media terminal 104 is used to synchronize an inputted annotation. The relative clock skew is used to determine the relative start time of the second media stream with respect to the start time of the first media stream. The clock skew between the first user media terminal 102 and the content sharing server 108 is determined. Further, the clock skew between the second user media terminal 104 and the content sharing server 108 is determined. The two clock skews are used to determine a relative clock skew between the first user media terminal 102 and the second user media terminal 104. The relative clock skew is used to adjust the timing of the inputted annotation and render it at the appropriate point in the second media stream.

In accordance with an embodiment of the present invention, when the Peer-to-Peer (P2P) protocol is used to share the annotations between the first user media terminal 102 and the second user media terminal 104, the relative clock skew between the first user media terminal 102 and the second user media terminal 104 is calculated directly without using the content sharing server 108.

In accordance with another embodiment of the present invention, an Automated Measurement of Line-Up (AMOL) data of the second media stream is used to synchronize an inputted annotation. The AMOL data from a vertical blanking interval of the second media stream is decoded. The decoded AMOL data is used to adjust the timings of the inputted annotation and synchronize it on the basis of the relative start time of the first and the second media streams. The AMOL data is generally used, if the first user media terminal 102 and the second user media terminal 104 receive the media streams from different content sources. For example, the AMOL data is used for synchronization purposes when the first user media terminal 102 and the second user media terminal 104 receive the media streams from the first content source 202 and the second content source 204 respectively.

In accordance with another embodiment of the present invention, the information obtained by sampling an audio channel of the media stream is also used for synchronizing the inputted annotation. The audio channel of the second media stream is sampled for a few seconds and a fingerprint of the second media stream is computed using either a discrete cosine transformation or Fourier transformation. The fingerprint is of approximately 200 bytes and is included at the beginning of the inputted annotation to synchronize the inputted annotation with the appropriate points in the media stream.

Further at step 414, the synchronized annotation is sent to the annotation rendering engine 312. The annotation rendering engine 312 renders the synchronized annotation to the second media stream. The second viewer 304 receives the annotation of the first viewer 302 along with the executed media stream on the second user media terminal 104. For the second viewer 304, the received annotation is a part of the second media stream. The method terminates at step 416.

When the second viewer 304 receives at least one annotation from the first viewer 302, then the second viewer 304 may respond to the first viewer 302 in form of at least one annotation. As a result, an iterative conversation can take place between the first viewer 302 and the second viewer 304. For example, the first viewer 302 can input a speech annotation in form of a voice note using the annotation input interface 306.

In accordance with an embodiment of the present invention, the annotation input interface 306 may be present between the second viewer 304 and the second user media terminal 104 for facilitating the second viewer 304 to input at least annotation. Further, the second user media terminal 104 may include the annotation anchoring interface 308 for anchoring the annotations input at the second user media terminal 104 to the second media stream. Furthermore, the first user media terminal 102 may include the annotation rendering engine 312 for rendering the annotation received at the first user media terminal 102 to the first media stream.

Figure 5:
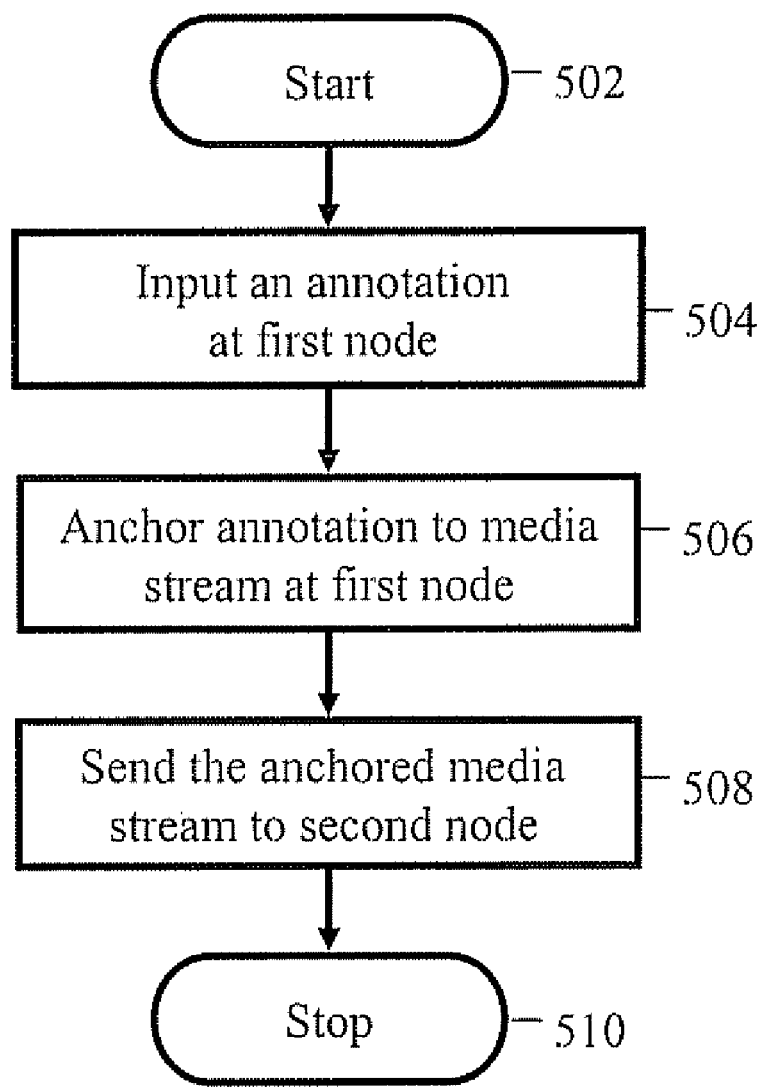
FIG. 5 is a flow diagram illustrating a method for sharing at least one annotation between the first user media terminal and the second user media terminal, in accordance with an embodiment of the present invention.

FIG. 5 is a flow diagram illustrating a method for sharing at least one annotation between the first user media terminal 102 and the second user media terminal 104, in accordance with another embodiment of the present invention. The first viewer 302 and the second viewer 304 share annotations according to the method described in FIG. 4, when they receive the similar media streams from either a common source or different sources. However, when the first viewer 302 and the second viewer 304 do not receive the similar media streams, they may share the annotations in a different manner. For example, the first viewer 302 may possess a personalized copy of a media content and want to share annotations associated with it with the second viewer 304. The second viewer 304 may not receive and possess a copy of the media content.

The method initiates at step 502. At step 504, the first viewer 302 can input an annotation using the annotation input interface 306 for his personalized copy of the media content. At step 506, the inputted annotation is anchored to the media stream on the first user media terminal 102 using the annotation anchoring interface 308. Further, at step 508, the anchored media stream is sent to the second user media terminal 104 using the content sharing server 108. Therefore, in this way, the second user media terminal 104 receives the media stream from the first user media terminal 102. As a result, the second user media terminal 104 also possesses a copy of the media content. The received media stream is anchored with the annotations inputted by the first viewer 302. The media streams can be executed simultaneously on the first user media terminal 102 and the second user media terminal 104 for mutual sharing of the annotations on the media stream. Therefore, in this way, the first viewer 302 and the second viewer 304 can share annotations with each other, when they do not receive and possesses the similar media streams. The method terminates at step 510.

Various embodiments of the present invention have significant advantages over the methods and systems that existed earlier. The method described in the present invention facilitates sharing the annotations between user media terminals such as Digital Video Recorder (DVRs). The present invention facilitates the viewers of the DVRs to create and share personal comments about a media content with other viewers. The present invention further facilitates sharing personalized copies of the media content across DVRs. Further, the present invention allows maintaining the annotations at exactly the same point in the different media streams across the DVRs despite their broadcast time variability across geographic locations and variable clock skew. Furthermore, the present invention facilitates sharing annotations separately from the media content, thereby preserving the Digital Rights Management (DRM) rules about media exchange between the DVRs.

It will be appreciated that the method and system for sharing annotations in a communication network may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method for sharing annotations in a communication network. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required, or essential features or elements of any or all the claims. The invention is defined solely by the appended claims, including any amendments made during the pendency of this application, and all equivalents of those claims, as issued.

What is claimed is:

1. A method for sharing at least one annotation between a first user media terminal and a second user media terminal in a communication network, the at least one annotation being associated with a media stream, the media stream being executed on at least one of the first user media terminal and the second user media terminal, the method comprising:
   inputting the at least one annotation on the first user media terminal;
   anchoring the at least one annotation to the media stream, the media stream being executed on the first user media terminal at a first start time; and
   sending the at least one annotation from the first user media terminal to the second user media terminal by using a Peer to Peer protocol, the at least one annotation received at the second user media terminal is synchronized.

2. The method as recited in claim 1, wherein the at least one annotation received at the second user media terminal is synchronized with the media stream based on a relative start time of the media stream on the first user media terminal and the second user media terminal.

3. The method as recited in claim 1, wherein inputting the at least one annotation comprises recording a voice message of a user or using a remote device.

4. The method as recited in claim 1, further comprising sending an anchored media stream to the second user media terminal, the anchored media stream being formed by anchoring the at least one annotation to the media stream on the first user media terminal.

5. The method as recited in claim 1, further comprising receiving the at least one annotation from the second user media terminal in response to the least one annotation.

6. A method for sharing at least one annotation between a first user media terminal and a second user media terminal in a communication network, the at least one annotation being associated with a media stream, the media stream being executed on at least one of the first user media terminal and the second user media terminal, the method comprising:
   receiving the at least one annotation at the second user media terminal from the first user media terminal using a Peer to Peer protocol;
   synchronizing the at least one annotation based on a relative start time of the media stream on the first user media terminal and the second user media terminal; and
   rendering the synchronized at least one annotation to the media stream, the media stream being executed on the second user media terminal at a second start time.

7. The method as recited in claim 6, wherein synchronizing the at least one annotation comprises synchronizing the at least one annotation by using a relative clock skew between the first user media terminal and the second user media terminal.

8. The method as recited in claim 6, wherein synchronizing the at least one annotation comprises synchronizing the at least one annotation by using the Automated Measurement of line-up (AMOL) data of the media stream on the second user media terminal.

9. The method as recited in claim 6, wherein synchronizing the at least one annotation comprises synchronizing the at least one annotation by using the information obtained from sampling an audio channel of the media stream on the second user media terminal.

10. A communication network for sharing at least one annotation between a first user media terminal and a second user media terminal, the at least one annotation being associated with a media stream, the media stream being executed on at least one of the first user media terminal and the second user media terminal, the system comprising:
    the first user media terminal configured to:
        input the at least one annotation;
        anchor the at least one annotation to the media stream, the media stream being executed on the first user media terminal at a first start time;
        send the at least one annotation to the second user media using a Peer to Peer protocol; and
    the second user media terminal configured to:
        receive the at least one annotation from the first user media terminal using the Peer to Peer protocol;
        synchronize the at least one annotation based on a relative start time of the media stream on the first user media terminal and the second user media terminal; and
        render the synchronized at least one annotation to the media stream, the media stream being executed on the second user media terminal at a second start time.

11. The communication network as recited in claim 10 further comprising an annotation input interface configured to accept input of the at least one annotation.

12. The communication network as recited in claim 10 further comprising a recording device configured to record a voice message of a user.

13. The communication network as recited in claim 10 further comprising an anchoring interface configured to anchor the at least one annotation to the media stream on the first user media terminal.

14. The communication network as recited in claim 10 further comprising a content sharing interface configured to share the at least one annotation between the first user media terminal and the second user media terminal.

15. The communication network as recited in claim 14, wherein the content sharing interface is further configured to share the media stream between the first user media terminal and the second user media terminal.

16. The communication network as recited in claim 10 further comprising a media splicing and rendering engine configured to render the media stream and the synchronized at least one annotation on the second user media terminal.

* * * * *